Sept. 10, 1929.   G. F. WIKLE   1,727,423
FABRIC SPREADER FOR TIRE BUILDING MACHINES
Filed March 20, 1926
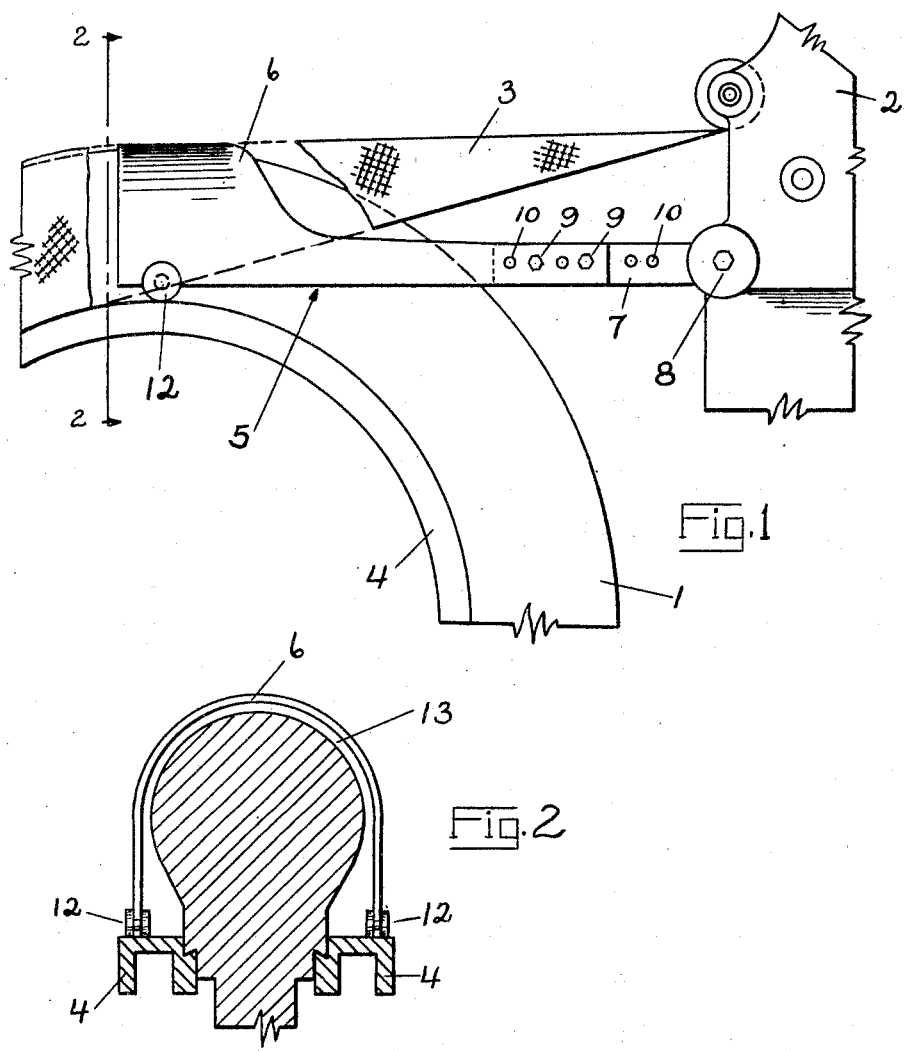
George F. Wikle
Inventor
By
Attorney Patented Sept. 10, 1929.

1,727,423

UNITED STATES PATENT OFFICE.

GEORGE F. WIKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

FABRIC SPREADER FOR TIRE-BUILDING MACHINES.

Application filed March 20, 1926. Serial No. 96,234.

My invention relates to that type of building machine in which the end of a web of carcass material is clamped to or otherwise held on a rotatable core and a plurality of convolutions wound on the latter to form the tire carcass. More particularly it pertains to a spreader adapted to partially shape the carcass material as the latter is drawn onto the core. The spreaders at present used for this purpose ride upon the surface of the core or the carcass material thereon. I find that this is objectionable in that it tends to displace the elements of the material already on the core and it is the object of my invention to overcome this objection. To this end I propose to support the spreader independently of the surface of the core and of the carcass material already in position thereon. In the accompanying drawings which illustrate one embodiment of my invention, Figure 1 is a side elevation of my improved spread, Figure 2 is a cross-section substantially on the line 2—2 of Figure 1.

Referring to the drawings 1 designates the building core or former of a tire building machine, and 2 designates a portion of the building machine from which the web of carcass material 3 is drawn onto the core. The core 1 is provided with bead rings 4 which may be of the type disclosed in my copending application, Serial Number 72,244, filed November 30, 1925. My improved spreader indicated generally at 5 comprises an arcuate portion 6 adapted to fit over the core 1 and provided with arms 7 pivoted to an adjacent portion of the building machine as at 8. Arms 7 are preferably made adjustable and in the form illustrated this adjustment is secured by forming the arms 7 of two pieces selectively bolted together by means of bolts 9 passing through holes 10 in the sections of arms 7. It will be understood that any suitable type of adjustment may be used. The arcuate portion 6 is provided at its edges with rollers 12 which ride upon the upper faces of bead rings 4 and maintain the spreader in spaced relation to the core, as is clearly shown in Figure 2. It will be understood that the space 13 between the core and spreader is sufficient to accommodate the thickness of the plies of carcass material without permitting contact of the spreader therewith.

I claim:

1. A fabric spreader for tire building machines comprising an arcuate member formed to embrace the crown and sides of the tire building core and means engaging a portion of the core below the base of the beads of a tire carcass formed thereon to hold the arcuate member in spaced relation to the core and tire carcass.

2. A fabric spreader for tire building machines comprising an arcuate member formed to embrace the crown and sides of the tire building core and anti-friction means carried by the edges of the arcuate member and engaging a surface of the bead rings of the core to hold said member in spaced relation to the core and tire carcass.

3. A fabric spreader for tire building machines comprising an arcuate member formed to embrace the crown and sides of the tire building core and means engaging a nonfabric supporting portion of the core to hold the arcuate member in spaced relation to the core and tire carcass.

In testimony whereof I have signed my name to the above specification.

GEORGE F. WIKLE.